(12) United States Patent
Peinado et al.

(10) Patent No.: US 7,975,117 B2
(45) Date of Patent: Jul. 5, 2011

(54) ENFORCING ISOLATION AMONG PLURAL OPERATING SYSTEMS

(75) Inventors: Marcus Peinado, Bellevue, WA (US);
Paul England, Bellevue, WA (US);
Bryan Mark Willman, Kirkland, WA (US); Yuqun Chen, Bellevue, WA (US);
Andrew John Thornton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1278 days.

(21) Appl. No.: 10/741,629

(22) Filed: Dec. 19, 2003

(65) Prior Publication Data
US 2004/0205203 A1 Oct. 14, 2004

Related U.S. Application Data

(60) Provisional application No. 60/457,519, filed on Mar. 24, 2003.

(51) Int. Cl.
*G06F 13/00* (2006.01)
(52) U.S. Cl. ......................... 711/163; 711/153
(58) Field of Classification Search .................. 711/153, 711/163
See application file for complete search history.

(56) References Cited

U.S. PATENT DOCUMENTS

| | | | | |
|---|---|---|---|---|
| 4,459,954 A | | 7/1984 | Slavik et al. ............. | 123/350 |
| 4,837,674 A | * | 6/1989 | Takane .................... | 710/48 |
| 5,621,912 A | | 4/1997 | Borruso et al. .......... | 709/1 |
| 5,652,853 A | | 7/1997 | Duvalsaint et al. ...... | 711/203 |
| 5,668,997 A | * | 9/1997 | Lynch-Freshner et al. ... | 719/329 |
| 5,764,984 A | | 6/1998 | Loucks ................... | 709/319 |
| 5,771,383 A | | 6/1998 | Magee et al. ........... | 709/312 |
| 5,835,764 A | | 11/1998 | Platt et al. ............... | 709/101 |
| 5,842,226 A | | 11/1998 | Barton et al. ............ | 711/203 |
| 5,875,487 A | | 2/1999 | Schwartz et al. ........ | 711/202 |
| 5,892,900 A | | 4/1999 | Ginter et al. ............ | 713/200 |
| 5,940,869 A | | 8/1999 | Schwartz ................ | 711/206 |
| 5,991,797 A | * | 11/1999 | Futral et al. ............. | 709/216 |
| 6,049,854 A | * | 4/2000 | Bedarida ................. | 711/153 |
| 6,075,938 A | * | 6/2000 | Bugnion et al. ......... | 703/27 |
| 6,195,710 B1 | | 2/2001 | Borgendale et al. .... | 709/328 |
| 6,308,247 B1 | | 10/2001 | Ackerman et al. ...... | 711/206 |
| 6,374,401 B1 | * | 4/2002 | Curtis .................... | 717/175 |
| 6,397,242 B1 | | 5/2002 | Devine et al. ........... | 709/1 |
| 6,466,962 B2 | | 10/2002 | Bollella ................. | 709/107 |
| 6,496,847 B1 | | 12/2002 | Bugnion et al. ......... | 709/1 |
| 2002/0010811 A1 | * | 1/2002 | Arndt et al. ............. | 710/5 |
| 2002/0169987 A1 | * | 11/2002 | Meushaw et al. ....... | 713/201 |
| 2003/0115443 A1 | * | 6/2003 | Cepulis et al. .......... | 713/2 |

(Continued)

OTHER PUBLICATIONS

James P. Anderson, "Computer Security Technology Planning Study", Oct. 1972, vol. 1-Executive Summary, 1-35.

(Continued)

*Primary Examiner* — Reba I Elmore
(74) *Attorney, Agent, or Firm* — Woodcock Washburn LLP (57) ABSTRACT

Plural guest operating systems run on a computer, where a security kernel enforces a policy of isolation among the guest operating systems. An exclusion vector defines a set of pages that cannot be accessed by direct memory access (DMA) devices. The security kernel enforces an isolation policy by causing certain pages to be excluded from direct access. Thus, device drivers in guest operating systems are permitted to control DMA devices directly without virtualization of those devices, while each guest is prevented from using DMA devices to access pages that the guest is not permitted to access under the policy.

16 Claims, 5 Drawing Sheets

U.S. PATENT DOCUMENTS

| | | | | |
|---|---|---|---|---|
| 2003/0120706 | A1* | 6/2003 | Harjula | 709/104 |
| 2003/0131067 | A1 | 7/2003 | Downer et al. | 711/202 |
| 2003/0200402 | A1 | 10/2003 | Willman et al. | 711/154 |
| 2003/0200405 | A1 | 10/2003 | Willman et al. | 711/163 |
| 2003/0200412 | A1 | 10/2003 | Peinado et al. | 709/213 |
| 2004/0203296 | A1* | 10/2004 | Moreton et al. | 439/894 |
| 2004/0205755 | A1* | 10/2004 | Lescouet et al. | 718/100 |
| 2004/0230794 | A1* | 11/2004 | England et al. | 713/164 |
| 2005/0055470 | A1* | 3/2005 | Arndt et al. | 710/1 |
| 2005/0060603 | A1* | 3/2005 | Pomaranski et al. | 714/7 |

OTHER PUBLICATIONS

James P. Anderson, "Computer Security Technology Planning Study", Oct. 1972, vol. 2-1-134.

Bershad, B.N. et al., "Extensibility, Safety and Performance in the *SPIN* Operating System", *Department of Computer Science and Engineering*, Mar. 30, 1995, 1-16.

Bugnion, E. et al., "Disco: Running Commodity Operating Systems on Scalable Multiprocessors", *Proceedings of the 16th Symposium on Operating Systems Principles (SOSP)*, Oct. 1997, 1-14.

Coffing, C.L., "An x86 Protected Mode Virtual Machine Monitor for the MIT Exokernel", *Submitted to the Department of Electrical Engineering and Computer Science, Massachusetts Institute of Technology*, May 1999, 1-109.

Ganger, G.R. et al., "Fast and Flexible Application-Level Networking on Exokernel Systems", *ACM Transactions on Computer Systems*, Feb. 2002, 20(1), 49-83.

Goldberg, R.P., "Survey of Virtual Machine Research", *Computer*, 34-45, Jun. 1974.

Karger, P.A. et al., "A VMM Security Kernel for the VAX Architecture", *IEEE*, 1990, 2-19.

Lampson, B.W., "Protection", *Proc. 5th Princeton Conf. on Information Sciences and Systems*, 1971, 437-Reprinted, *ACM Operating Systems Rev.*, Jan. 1974, 8(1), 18, 10 pages.

Popek, G.J. et al., "Formal Requirements for Virtualizable Third Generation Architectures", *Communications of the ACM*, Jul. 1974, 17(7), 412-421.

Robin, J.S. et al., "Analysis of the Intel Pentium's Ability to Support a Secure Virtual Machine Monitor", 5 pages, 2000.

Shapiro, J.S. et al., "EROS: a fast capability system", *17th ACM Symposium on Operating Systems Principles*, Dec. 1999, 34(5), 170-185.

Smith, J.E., "An Overview of Virtual Machine Architectures", Oct. 27, 2001, 1-20.

Sugerman, J. et al., "Virtualizing I/O Devices on VMware Workstation's Hosted Virtual Machine Monitor", *Proceedings of the 2001 USENIX Annual Technical Conference*, Jun. 25-30, 2001, USENIX Association, 15 pages.

Waldspurger, C.A., "Memory Resource Managament in VMware ESX Server", *Proceedings of the 5th Symposium on Operating Systems Design and Implementation*, Dec. 9-11, 2002, 15 pages.

Secure Minicomputer Operating System (KSOS), Executive Summary-Phase 1: Design of the Department of Defense Kernelized Secure Operating System, Ford Aerospace & Communications Corporation, 15 pages, Apr. 1978.

Department of Defense Standard, "Department of Defense Trusted Computer System Evaluation Criteria", Dec. 1985, Issued under the authority of an in accordance with DoD Directive 5200.28, 100 pages.

Common Criteria, "Common Criteria for Information Technology Security Evaluation", Part 3: Security Assurance Requirements, Aug. 1999, Version 2.1, CCMIB-99-033, 208 pages.

Engler, D.R. et al., "Exokernel: An Operating System Architecture for Application-Level Resource Management", *Association for Computing Machinery*, 1995, 1-16.

Pfitzmann, B. et al., "The PERSEUS System Architecture", *Computer Science/Mathemetics*, Apr. 9, 2001, 15 pages.

Kaashoek, M.F. et al., "Application Performance and Flexibility on Exokernel Systems", *Proceedings of the 16th Symposium on Operating Systems Principles(SOSP)*, Oct. 1997, 1-14.

* cited by examiner

ENFORCING ISOLATION AMONG PLURAL OPERATING SYSTEMS

CROSS-REFERENCE TO RELATED CASES

This application claims the benefit of U.S. Provisional Application Ser. No. 60/457,519, entitled "High Assurance Computing on Open Hardware Architectures", filed on Mar. 24, 2003.

FIELD OF THE INVENTION

The present invention relates generally to the field of computing and, more particularly, to a mechanism that enforces a policy of isolation among plural software objects.

BACKGROUND OF THE INVENTION

In some circumstances, it is desirable to run plural operating systems concurrently on the same computer. For example, two different types of operating systems (e.g., the WINDOWS XP operating system, and one of the Unix derivatives) could be run on the same machine in order to increase the range of software that can be run on that machine. In another example, plural instances of the same operating system (e.g., two or more instances of the WINDOWS XP operating system) could be run side by side on the same machine. In yet another example, it may be desirable to run a general-purpose operating system side-by-side with a "high-assurance" operating system (i.e., an operating system that performs a limited set of functions, but with a high level of assurance that those functions will be performed correctly); in this case, the ordinary user applications run under the general purpose operating system, and security-related application (e.g., digital rights management enhancements to the conventional applications) can be run under the high-assurance operating system.

A Virtual Machine Monitor (VMM) is the traditional approach to running plural operating systems on one machine. A VMM essentially "virtualizes" a physical machine, by exposing "virtual hardware" to the operating systems that run on top of the VMM. Inasmuch as an operating system's function is to control the hardware of the machine on which the operating system runs, when a VMM is employed the VMM provides to each operating system a set of "virtual" hardware to control, and the operating system controls the VMM's virtual hardware instead of the real hardware. The VMM, in turn, contains drivers that control the real hardware based on the instructions that the operating system has given to the virtual hardware. In essence, the VMM provides each operating system with the illusion that the operating system has control over the entire machine. Due to this illusion, it appears to each operating system as if there are no other operating systems.

The design of a VMM has two advantages. First, since typical mass-market operating systems expect to control the entire machine, these mass-market operating systems can be easily adapted to run on VMMs with little or no modification, since a VMM gives each operating system an entire virtual machine to control. Second, since a VMM exposes virtual devices, instead of actual devices, to the operating systems, an operating system cannot use a driver for a direct memory access (DMA) device to reach into portions of the physical address space that stores another operating system's data. (Normally, a DMA device can access the entire physical address space of the machine to which it is attached, and thus an operating system can effectively access any portion physical address space through a DMA device by using a device driver to cause the DMA device to access a particular portion of the physical address space. In the case of a VMM, all instructions to the real devices are issued by the VMM, since the operating systems control only the virtual devices exposed by the VMM. Since the operating systems only control the DMA devices indirectly through the VMM, the operating systems can only cause DMA devices to access those portions of the physical address that the VMM permits.)

Despite these advantages, VMMs have a significant drawback: Since VMMs attempt to virtualize the entire machine, the VMM must provide its own device driver for every device that can conceivably be attached to the real hardware; otherwise, the VMM cannot support such a device. In the case of an open hardware architectures (i.e., an architecture that allows arbitrary peripheral hardware devices to be connected to it and exposed to applications) providing a comprehensive VMM that virtualizes every conceivable hardware peripheral is an impractical task. Additionally, requiring an operating system to control the hardware indirectly through virtual devices significantly reduces performance (i.e., speed).

In view of the foregoing, there is a need for a mechanism that overcomes the drawbacks of the prior art.

SUMMARY OF THE INVENTION

The present invention provides a mechanism that allows multiple operating system to run on a computing device, while maintaining a policy of isolation among the operating systems. As noted above, an operating system can use a DMA device to access any portion of the physical address space, and thus giving operating systems direct control over DMA devices is problematic when the isolation policy calls for some portion of the physical address space to be inaccessible to one of the operating systems. The present invention allows the operating systems to control DMA devices directly, while also preventing an operating system from using a DMA device to access memory that the operating system is not supposed to access. Since the operating systems can control devices directly, the mechanism of the present invention may include a software component that enables plural operating systems to run together, where the software component does not need to virtualize the devices or provide its own drivers for the devices.

In accordance with the invention, plural operating systems run on a computer, and each operating system is permitted to control the hardware of the computer directly. Each operating system is given a portion of the computer's physical address space, and may be assigned devices to control. The physical address space given to an operating system can be any subset of the physical address space of the machine, and is not necessarily zero-based. An exclusion vector defines which pages of the physical address space can be accessed directly by DMA devices (or that can otherwise be accessed using a physical address), and the hardware may be configured not to permit access when an access request is made for an address to which direct access is excluded. (As more particularly discussed below, the DMA exclusion vector need not be a single bit vector in the traditional sense, but can more generally be an arbitrary function that indicates whether access to a page is permitted or denied based on some variable(s).) When a request is made to access an excluded address, the request may be ignored, or an exception may be generated, or (in the case of a read request) some value other than the stored value may be returned, etc.

A security kernel maintains the contents of the exclusion vector, and may change the vector's contents as needed to enforce the isolation scheme. The security kernel contains code that determines what portions of the physical address space should be made inaccessible to DMA devices. For example, the security kernel may define certain pages as being off limits to all DMA devices. Or, the security kernel may associate certain pages with certain DMA devices, and may allow a DMA device to access only those pages assigned to that device. Or, as yet another alternative, DMA devices may be assigned to particular operating systems, and a DMA device may be allowed to access those pages assigned to the operating system associated with that device. If the set of pages that are off-limits to a DMA device changes dynamically, the security kernel can update the vector (or, more generally, the function that defines accessibility) to reflect which pages are off-limits at any given point in time.

It should be noted that the security kernel allows each operating system to use its drivers to control direct memory access (DMA) devices directly, while still maintaining isolation among the operating systems. Since DMA devices generally can access all of a machine's physical address space, in a conventional system a DMA device driver could be used as a universal back door through which one operating system could reach into another's private memory. However, since the security kernel sets the exclusion vector to block access to certain portions of the physical address space, operating systems can safely be allowed use their own drivers to control DMA devices directly, and any attempts by these devices to access off-limits memory will fail.

While the invention provides a mechanism through which plural operating systems can execute on a computer, it should be noted that the techniques herein can also be used to allow arbitrary software objects to execute on one machine while maintaining some level of isolation from each other.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Today's mass market computers are optimized for performance, functionality and other market requirements. One of the most critical commercial requirement is openness in hardware and in software. The most commercially-viable systems are those that can integrate and operate with the wide and growing variety of hardware peripherals, software applications and other extensions produced by a diverse and ever-changing set of vendors.

In contrast to most mass-market operating systems, high-assurance systems have been built for the past thirty years for a much smaller market made up organizations that have special security needs. In spite of the general recognition of the security merits of such high-assurance systems, these systems have so far failed to make significant inroads into either the corporate or consumer mass market. The fact that high-assurance systems generally lack the above-described benefits of "openness" has so far denied high assurance computing to the mass market. The present invention provides a solution to this problem by providing a mechanism to support both mass market and high assurance features in a single system.

The invention provides a system monitor called a security kernel (SK). The SK hosts operating systems that shall be referred to as "guest" operating system. In accordance with the invention described herein, device drivers are located in guest operating systems rather than in the SK. Conventionally, systems such as VMMs or Exokernels control DMA devices directly, rather than allowing the guests to control these devices directly, in order to prevent one guest from using a DMA device to reach into another guest's memory. A mechanism is described herein whereby the SK can maintain isolation among guests without having to provide drivers for DMA devices or otherwise manage the DMA devices.

Thus, the mechanisms described herein allow plural guest operating systems to run on a computing device. Isolation among the various guests is maintained, while still allowing the guests to have direct control over the computing device's hardware resources.

In one aspect, the invention comprises a software component that does not have to contain device drivers or try to virtualize devices in order to support isolation among plural guest operating systems (or other software objects, such as applications). Instead, the software component lets its guest operating systems (or applications) take direct control of the devices. The software component may be the SK mentioned above, an operating system, a type of VMM, or any other type of software component. Preferably, a system according to the invention has the following properties:

the software component, with the help of hardware (as described below) enforces isolation among its guests;
the software component is aware of a set of devices and a set of guests. The software component assigns particular devices to particular guests. In general, arbitrary assignments are possible.
a DMA device assigned to a particular guests g can access physical addresses assigned to g, but cannot access other physical addresses. (In greater generality, rather than assigning each device to a guest and allowing the device to access all physical addresses permitted to that guest, it is also possible to simply assign each device a portion of the physical address space that the device is permitted to access.)

Exemplary Computing Arrangement

Figure 1:
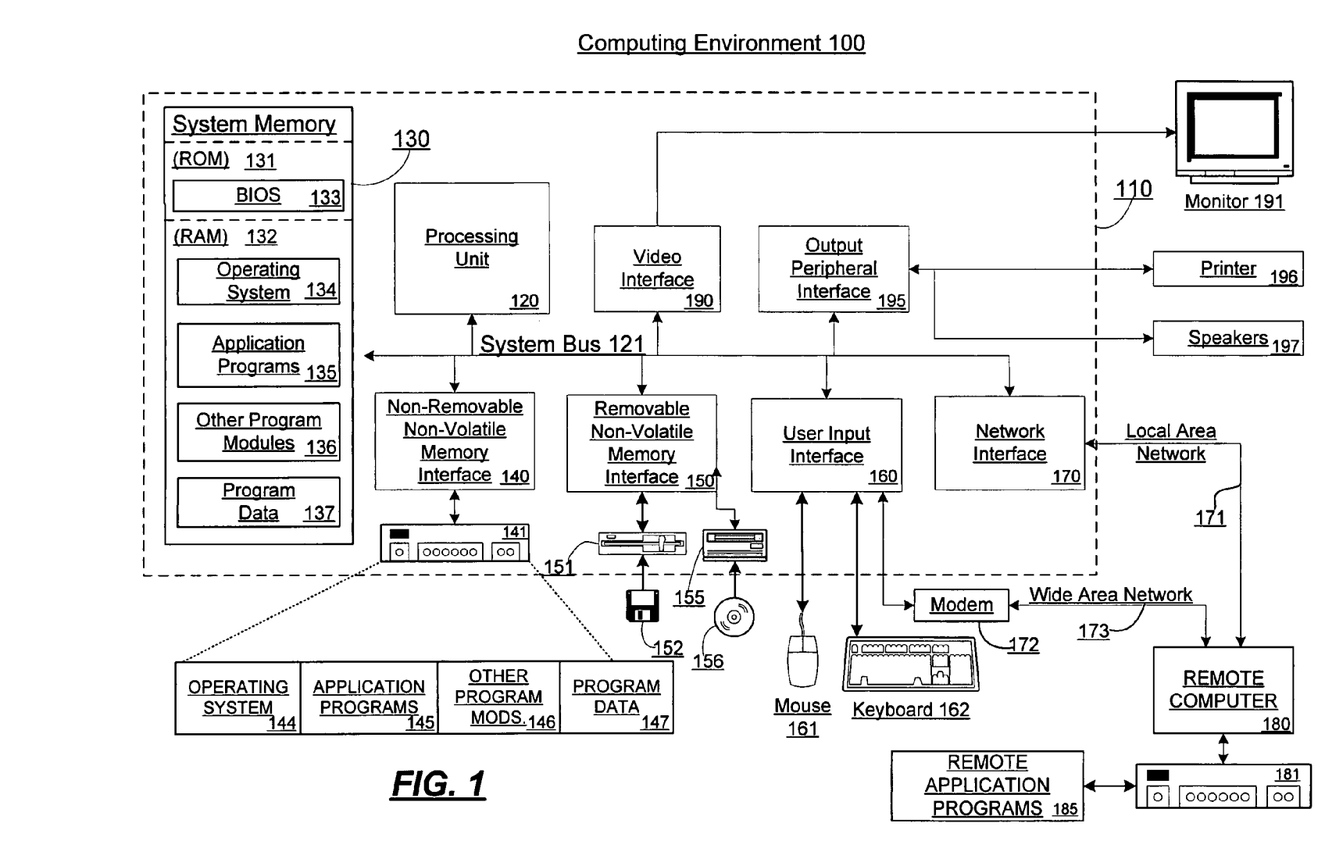
FIG. 1 is a block diagram illustrating an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Managing Plural Operating Systems on a Computing Device

Figure 2:
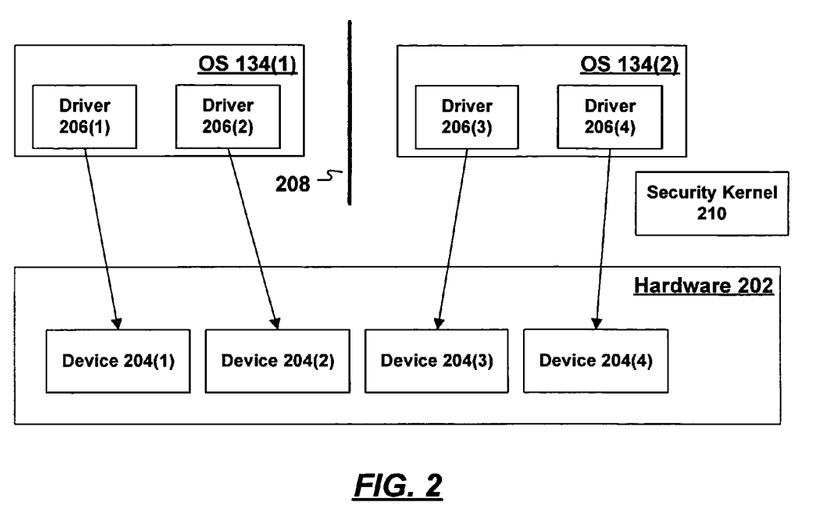
FIG. 2 is a block diagram illustrating a computing environment having a plurality of operating systems that run on computing hardware in which aspects of the invention may be implemented.

As described above in connection with FIG. 1, computer 110 may store an operating system 134. While FIG. 1 shows a single operating system 134 on computer 110, it is also possible for a computing device to have plural operating systems running thereon. FIG. 2 shows operating systems 134(1) and 134(2) running on hardware 202. Computer 110 (shown in FIG. 1) is an example of hardware 202, although it will be understood that the invention is not limited to any particular type of hardware.

One feature of hardware 202 is that hardware 202 includes, or is associated with, devices 204(1), 204(2), 204(3), and 204(4). The various hardware resources of a typical computer (e.g., a video card, a disk drive, etc.) are examples of devices. FIG. 2 shows these devices as being included within hardware 202, although it will be understood that a computer's devices (e.g., external printers, external modems, etc.) are not necessarily located inside of the computer's physical "box."

One function of an operating system is to control a computer's various devices. Operating systems control these devices through device drivers. Thus, operating system 134(1) includes device drivers 206(1) and 206(2), and operating system 134(2) includes device drivers 206(3) and 206(4). As shown in FIG. 2, drivers 206(1) through 206(4) control devices 206(1) through 206(4), respectively. While FIG. 2 shows drivers 206(1) through 206(4) as being part of either operating system 134(1) or 134(2), it will be understood that a driver can be viewed either as being part of an operating system, or as a separate software module usable by an operating system.

When operating systems 134(1) and 134(2) are running on hardware 202, it may be desirable to enforce a policy of isolation 208 between these two operating systems. The exact nature of this isolation may vary depending upon the circumstances. For example, isolation may take the form of preventing one operating system from accessing another operating system's private data, or preventing one operating system from controlling devices that have been assigned to another operating system. (It should be understood that devices, in some cases, are controlled by means of control registers that are part of a computer's physical address space; thus, the problems of limiting access to memory, and limiting access to devices, can both generally be addressed by mediating access to the physical address space.) For example, one of the operating systems (e.g., operating system 134(1)) may be given a portion of the physical address space that cannot be accessed by another operating system (e.g., operating system 134(2)). It should be understood that, while FIG. 2 shows two operating systems running on hardware 202 and isolated from each other, in greater generality any number of operating systems may run on hardware 202, and all of these operating systems (or some subset thereof) may be isolated from each other.

In a preferred embodiment, isolation 208 is enforced by a security kernel (SK) 210. Security kernel 210 is a software component that runs on hardware 202. A preferred embodiment of security kernel 210 is more particularly discussed below in connection with FIG. 9.

Figure 3:
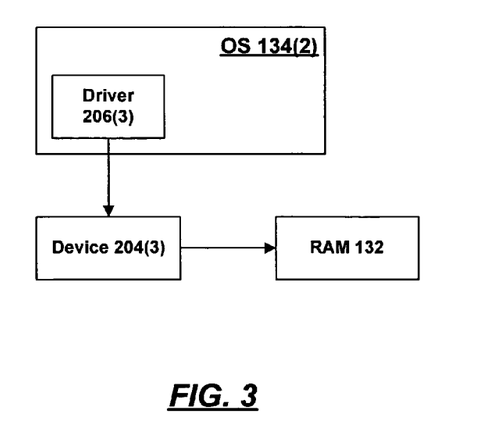
FIG. 3 is a block diagram of an environment that includes a direct memory access (DMA) device in which aspects of the invention may be implemented.

One aspect of isolation among operating systems is that it can form the basis for various different types of computer security. For example, an operating system that has a private or "curtained" memory can store a decryption key in that memory and can thus receive encrypted data with assurance that the decryption key will not be divulged to the outside world. Certain memory management techniques (e.g., shadow page tables) can be used to ensure that memory access requests made through virtual addresses cannot be used by one operating system to reach into another operating system's private memory (since the page tables can be controlled so that virtual addresses to one operating system's private memory are not exposed to another operating system). However, access requests that are made by physical address (as in the case of DMA devices) can be used to subvert a security scheme, since a request to access any physical address can be made irrespective of whether the physical address has a corresponding virtual address. FIG. 3 shows an example of the situation in which the ability to access the physical address space using physical addresses (e.g., as in the case of a DMA device) could be used to subvert an isolation scheme. (It should be understood that using a DMA device is not the only way to make an access request by physical address; for example, some processors permit access requests to be made by a physical address or a virtual address, and those requests made by physical address can be treated the same as requests coming from DMA devices. In the case of the INTEL x86 series of processors, while requests originating from the CPU almost always identify their target location by virtual address, there are certain modes in which physical addresses can be used and any such access request can be treated the same as a request coming from a DMA device.)

In FIG. 3, device 204(3) is able to directly address RAM 132, and is thus a DMA device. In this context, "directly address" means that device 204(3) has the ability to identify a portion of the physical address space (e.g., a physical location of RAM 132) and cause that location to be read and/or written. Since device 204(3) can identify any physical address in RAM 132 to be read or written, no information stored in RAM 132 can be considered protected from device 204(1). Thus, if there is some portion of RAM 132 that operating system 134(2) is not supposed to access under the isolation policy, operating system 134(2) can access this portion anyway by installing a device driver 206(3) that will cause device 204(3) to access the off-limits portion of the memory. In this sense, drivers for DMA devices are a potential security hole for systems whose security depends on memory isolation. For this reason, conventional systems that are designed to isolate two operating systems from each other on the same hardware generally do not allow the guest operating systems (including their device drivers) to control DMA devices directly.

With reference to FIG. 2, one example of the use of plural operating systems is the case where operating system 134(1) is a high-assurance operating system, and operating system 134(2) is an ordinary mass-market operating system. The high-assurance operating system provides certain functions that can be used for security applications, and also provides a high degree of assurance that it will perform its functions correctly. As described above, when plural operating systems are running on the same computer and have direct control over DMA devices, one operating system could tamper with another's private data through a DMA device. Thus, the high-assurance operating system's ability to perform its function is dependent upon a component (e.g., security kernel 210) enforcing the isolation 208 between the two operating systems. As a matter of terminology, given some functionality for which high-assurance is required, the "trusted computing base" is the set of components on which this functionality depends. In this example, the trusted computing base comprises operating system 134(1) and security kernel 210.

It should be noted that that the concepts of "high-assurance" and "security" are not identical, but are related in the sense that security can be provided by a high-assurance component. "Assurance" is the confidence one can have that a system will behave as specified—i.e., if a system is associated with a specification that describes its behavior, a "high-assurance" system is one that provides a relatively high level of assurance that the system will behave as specified. Thus, if security depends, for example, on a guest operating system having a private portion of memory that cannot be accessed by other sources (e.g., to store secret cryptographic keys, etc.), security is provided to the extent that one can be assured that the private memory cannot, in fact, be accessed by other sources. Thus, a high-assurance operating system can be used to provide security for a computer system.

Restricting Access to a Portion of the Physical Address Space

Traditionally, an operating system expects to have unrestricted control over a machine's full physical address space. This expectation presents a problem when two operating systems run on the same hardware under an isolation scheme. Since the physical memory may be expected to store some private data for one operating system that should not be accessible to another operating system, giving each operating system's DMA devices unrestricted access to the full physical address space effectively allows any operating system to access the private data. Traditional systems that support the use of plural operating systems expose a full physical address space to each operating system, but use a trusted component to mediate access to all hardware that can provide direct access to the memory. For example, a VMM exposes a virtual machine to an operating system, so that the operating system is provided with the illusion that it is controlling a full physical machine, while, in reality, the VMM is determining what instructions will be issued to the real hardware. In the case of memory access, a VMM provides to each operating system a "physical" address space for a virtual machine; behind the scenes, the VMM maps the "physical" addresses for this virtual machine into physical addresses for the "real" machine's hardware.

In accordance with one feature of the invention, each operating system (and/or the operating system's device drivers) is given the ability to control hardware directly. Traditionally, most systems that support the use of multiple guest operating systems could not allow the guest to touch hardware directly (e.g., by exposing actual physical addresses to the guests, or by otherwise exposing the hardware to the guests), the present invention does not require this restriction. Instead, in accordance with the present invention the actual physical address (or some other type of address, or some combination of physical addresses and other addresses) may be exposed to the guest operating system.

Since an example isolation scheme contemplates that the memory will be able to store private data for use by one operating system but not by another, the invention provides that each operating system can be given access to something less than the entire physical address space of the hardware.

Figure 4:
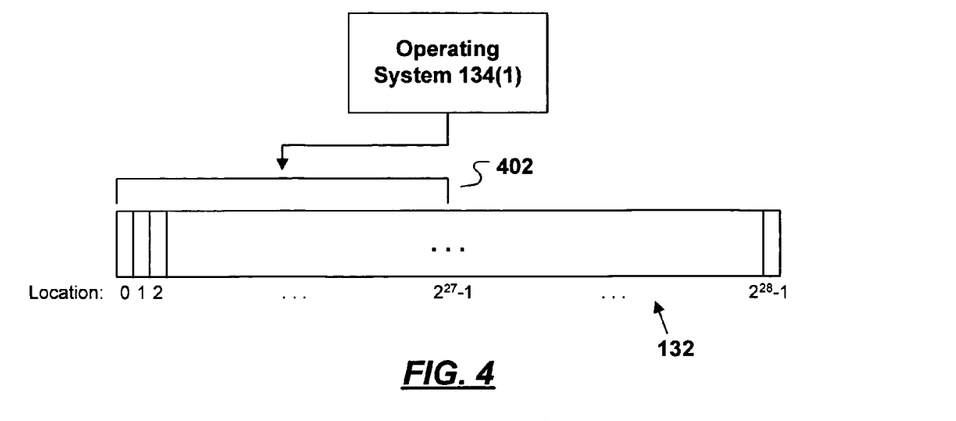
FIG. 4 is a block diagram of a first example of a computing environment in which aspects of the invention may be implemented where an operating system's assigned physical address space is less than the whole physical address space.

FIG. 4 shows an example in which an operating system is provided with access to less than the entire physical address space. The physical address space includes (but is not limited to) the bytes of RAM 132. (The physical address space may also include physical addresses that do not correspond to portions of RAM 132—e.g., control registers for devices.) In this example, RAM 132 comprises 256 megabytes of memory, where each memory location (e.g., each byte) is assigned a physical addresses ranging from zero through $2^{28}-1$. Traditionally, an operating system would expect to have control over this entire physical memory (as well as other elements of the physical address space). However, in the example of FIG. 4, operating system 134(1) is given control over a physical address space 402, which does not include all of the actual physical address space. For example, address space 402 may include bytes zero through $2^{27}-1$ of RAM 132, while bytes $2^{27}$ through $2^{28}-1$ cannot be directly controlled by operating system 134(1).

Figure 5:
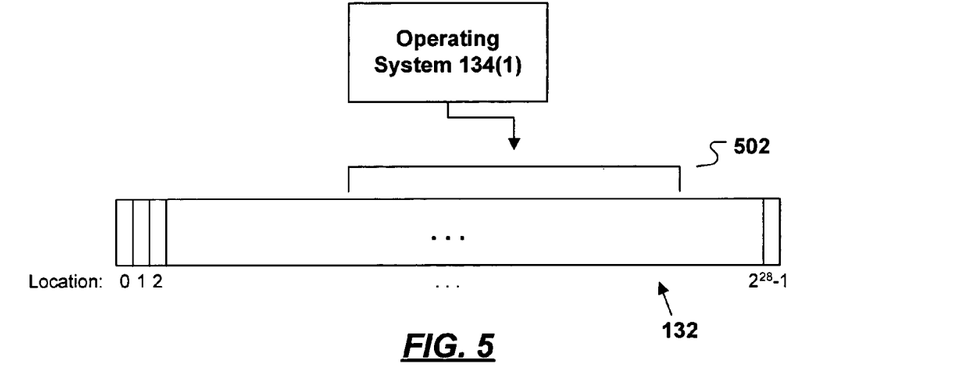
FIG. 5 is a block diagram of a second example of a computing environment in which aspects of the invention may be implemented where an operating system's assigned physical address space is less than the whole physical address space.

In the example of FIG. 4, operating system 134(1) is provided with half of the 256 megabytes of RAM, beginning with physical address zero. Since the physical address space is a contiguous portion of physical memory beginning with byte zero, it can be referred to as a "zero-based" physical address space. Operating system 134(1) can control this reduced address space just as if it were running on a machine that had only 128 megabytes of memory instead of 256 megabytes of memory. However, when a subset of RAM 132 is provided as an operating system's physical address space, that subset need not be zero-based. In FIG. 5, operating system 134(1) is provided with a physical address space 502, which does not include physical location zero. Thus, in the example of FIG. 5, operating system 134(1) is configured to understand that there are some portions of the physical address space that exist but that cannot be addressed directly by DMA devices that are under operating system 134(1)'s control.

It should be noted that FIGS. 4 and 5 shows examples in which the address spaces 402 and 502 provided to operating system 134(1) are contiguous, but such contiguousness is not required. It is possible to provide an operating system with an address space that is not contiguous.

Finally, it should be noted that "physical address space" includes, but is not limited to, a computer's RAM. For example, a device's control registers may be assigned some physical address, even though these control registers are not part of the general-use memory that a machine provides. These control registers, nevertheless, are part of the physical address space. Thus, the term "physical address space" should be understood to include all locations to which physical address are exposed, and is not limited to RAM.

Use of Partial Physical Address Spaces to Enforce Isolation

Figure 6:
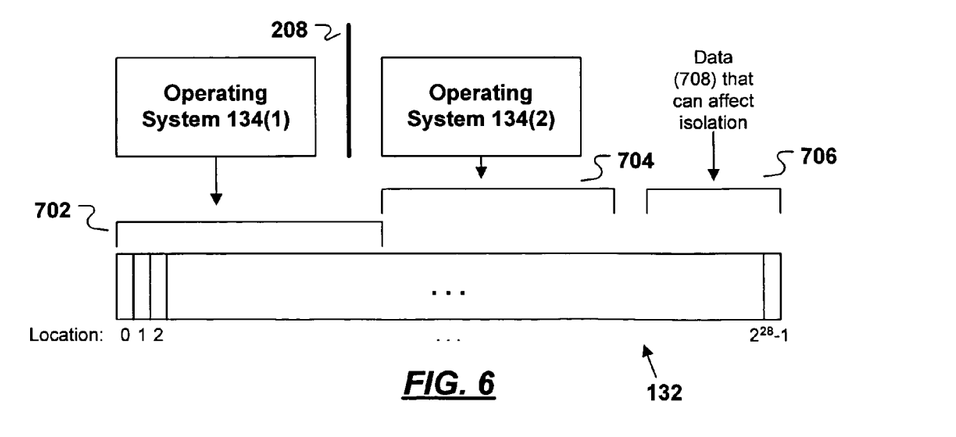
FIG. 6 is a block diagram of a system in which two operating systems have assigned physical address spaces that are less than the whole physical address space, and in which an isolation is imposed between the two operating systems.

One feature provided by the invention is that the assignment of partial physical address spaces (i.e., physical address spaces that are less than all of a physical memory) to plural operating systems may be used to enforce isolation between the operating systems. FIG. 6 shows an example in which an isolation is enforced between two operating systems, each of which is assigned a partial physical address space.

In the example of FIG. 6, operating system 134(1) is assigned physical address space 702, and operating system 134(2) is assigned physical address space 704. It should be noted that physical address spaces 702 and 704 are shown as being non-overlapping, although it is possible for two operating systems to be assigned overlapping address spaces.

An isolation 208 is enforced between operating system 134(1) and operating system 134(2). This isolation may, for example, provide one of the operating systems with memory that the other operating system cannot access. As described above, isolation 208 may be enforced by security kernel 210 (shown in FIG. 2). It will be understood that security kernel 210's ability to perform the isolation function depends on: (1) assurance that the code that implements security kernel 210 is not being tampered with; and (2) assurance that the data that defines the boundaries of the isolation is not being tampered with (e.g., the data that defines which memory locations are in a given operating system's partial address space). Tampering with any of the above-mentioned data could affect security kernel 210's ability to enforce isolation 208. Thus, the data 708 that can affect the enforcement of isolation 208 is stored in portion 706 of RAM 132, where portion 706 is not accessible to any of the guest operating systems. For example, where security kernel 210 is implemented as software, this software is stored in portion 706 of RAM 132. Additionally, the data that defines which memory locations are included in address spaces 702 and 704 is also stored in portion 706. Since operating systems 134(1) and 134(2) (and the DMA devices that they control) are denied the ability to access portion 706 directly, and since all data that can affect the enforcement of isolation 208 is stored in portion 706, operating systems 134(1) and 134(2) are effectively denied the ability to subvert the enforcement of isolation 208.

It should be noted that portions of the physical address space other than RAM 132 can affect isolation, and DMA devices should be denied access to these portions of the physical address space as well. For example, the control registers for a DMA device can be in the physical address space. A DMA device assigned to one guest operating system should not have the ability to access the control registers of a DMA device that is assigned to a different guest operating system.

Mediating Access to Memory

Figure 7:
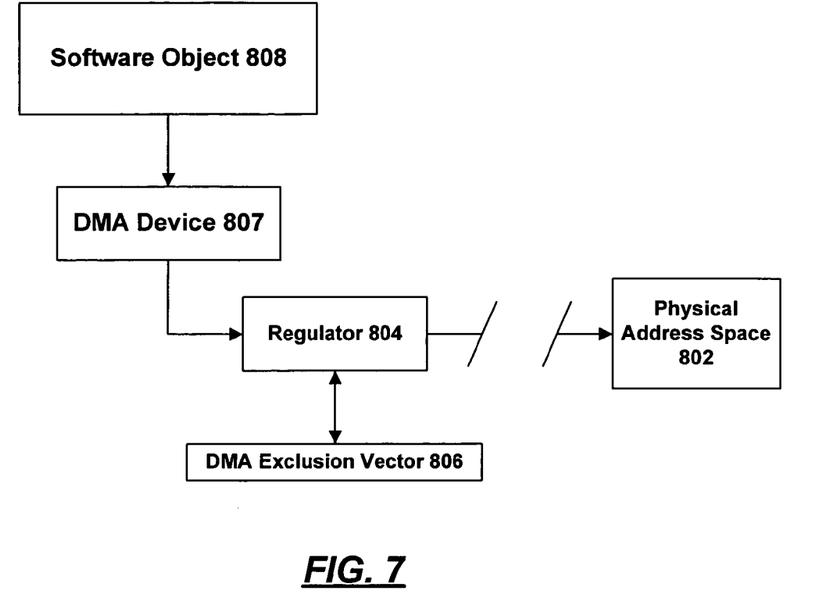
FIG. 7 is a block diagram of a system that employs a DMA exclusion vector to mediate access to a memory.

As discussed above, security kernel 210 enforces an isolation 208 between plural operating systems 134(1) and 134(2) by defining which portions of memory can physically be addressed by those operating systems, and which portions cannot. (Security kernel 210, isolation 208, and operating systems 134(1) and 134(2) are all shown in FIG. 2 and are described above.) Up to this point, it has been assumed that security kernel 210 has, at its disposal, some physical mechanism to deny access to a given portion of memory. FIG. 7 shows an example of such a mechanism.

In FIG. 7, it is assumed that there is a physical address space 802 to which access may be sought. RAM 132 (shown in FIG. 1) is an example of something that is part of physical address space 802, although it will be understood that the description herein is not limited to any particular type of hardware resource. Software object 808 issues requests to access (i.e., read or write) physical address space 802. Software object 808 is any type of object from which an access request may originate. For example, operating systems 134(1) and 134(2) are both examples of software object 808, as are drivers 206(1) through 206(4). However, software object 808 may be any other type of software object (e.g., an application program) from which a request to access memory 802 may originate. In the example of FIG. 7, it is assumed that software object 808 (e.g., a DMA device driver) causes the access request to be generated by DMA device 807.

Assuming that a request to access a physical location of memory 802 has been generated, regulator 804 determines whether the request should be allowed or not. (In one embodiment, on personal computers, the regulator might be implemented in hardware in the memory controller that is interposed between RAM, the CPU, and device buses, such as AGP or PCI.) In the example of FIG. 7, regulator 804 makes this determination by consulting DMA exclusion vector 806. DMA exclusion vector comprises data that describes whether access to a given physical memory location is, or is not, excluded to DMA devices. In essence, DMA exclusion vector 806 is a Boolean function f(a), where a is the physical address of the memory location to which access is sought; f(a) returns true or false depending on whether access is allowed or not. Typically, DMA exclusion vector 806 describes the accessibility of memory 802 with per-page granularity—i.e., each page of memory 802 is represented by one bit, where the bit is either on or off depending on whether access to that page is allowed. (However, as described below, other representations of DMA exclusion vector 806 are possible.)

When DMA exclusion vector 806 indicates that access to a requested location is not excluded, regulator 804 allows the requested access to proceed. If DMA exclusion vector 806 indicates that access to a requested location is excluded, regulator 804 blocks the request. In a preferred embodiment, when an access request is blocked, no additional action is taken; the hardware simply proceeds as usual, except without the requested access having taken place. Optionally, however, regulator 804 can take various actions when an access request is blocked. For example, regulator 804 can raise an exception or trap, and this exception or trap could be handled by security kernel 210, which performs a further evaluation of the request, and, depending on the evaluation, may: (1) determine that the requested access is harmless to the isolation scheme and allow it to proceed; (2) determine that the requested access can be modified to be harmless to the isolation scheme, and allow the requested access to proceed in some modified form; or (3) determine that the request is harmful, block the request, and return an error to software object 808.

Generalized DMA Exclusion Vector

Figure 8:
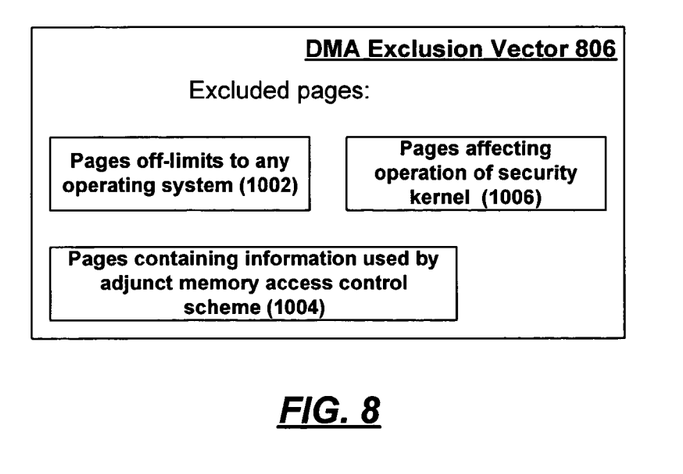
FIG. 8 is a block diagram of an example DMA exclusion vector.

FIG. 8 shows an example of pages that may be excluded by a DMA exclusion vector. In order to prevent DMA devices from being used to access an operating system's private memory, the pages 1002 that are part of any operating system's private memory should be excluded from access by DMA devices. Additionally, when some type of adjunct memory access control scheme is employed to prevent unpermitted memory access from taking place through a virtual address system, pages 1004 that store information related to this adjunct scheme should be excluded from access by DMA devices. Moreover, since the security kernel controls the contents of the DMA exclusion vector and carries out the address translation control scheme, any pages 1006 that can affect the operation of the security kernel should be excluded from access by DMA devices; if a DMA device could edit these pages 1006, it could subvert the isolation scheme by manipulating the security kernel in such a way that the contents of the DMA exclusion vector would be changed, or in such a way that address translation control would cease to function properly.

While FIG. 8 depicts sets of excluded pages as blocks within DMA exclusion vector 806, as described above the contents of DMA exclusion vector is preferably represented as an array of bits corresponding to the pages of the physical address space, where each bit indicates whether its corresponding page is, or is not, excluded from access by DMA devices.

It should be understood, however, that various schemes are possible to represent what portions of the physical address space should be excluded from access by DMA devices (or that should otherwise not be accessed by physical address), and that the invention is not limited to the case of a single exclusion vector that universally defines what portions of the physical address space are off-limits to DMA devices. Thus, the portions of the physical address space that are off limits to DMA devices could change based on which guest is active, which device is making the request, etc. For example, the following schemes could be used:

There could be plural exclusion vectors, as well as structures (e.g., designated portions of memory, or special registers) that store information indicating which exclusion vector is assigned to a particular device. (Devices could be grouped together such that each device belonging to a particular guest is assigned to the same exclusion vector, although, as noted above, in greater generality it is possible to assign a device a particular set of physical locations that it may access irrespective of which guest the device belongs to. In this latter case, each device could have its own exclusion vector.)

There could be plural exclusion vectors, and each device could be given some mechanism to identify which exclusion vector the device is associated with. For example, each device could be assigned a secret that would be tendered at the time an access request is made, and this secret would identify the exclusion vector, and also prevent unauthorized devices that do not know the secret from using that exclusion vector.

The system could require that all devices be reset each time a new guest is scheduled. Since each guest would use a different exclusion vector, and since many DMA devices can queue actions to be executed subsequent to when the request is made, a device belonging to guest 1 could queue a request, which is not executed until guest 2 (and its exclusion vector) have become active. This would cause a guest 1 request to be evaluated under guest 2's exclusion vector, which has the potential to violate the isolation scheme. Resetting each device when a new guest is scheduled would effectively de-queue any pending request, so that the only access requests coming from devices are those that were generated by the currently active guest, and those requests can be evaluated under the active guest's exclusion vector instead of under some other some other guest's exclusion vector.

Devices could be permitted to operate on some type of virtual address instead of on physical addresses, and a mechanism could be used that translates these virtual addresses into physical addresses. Each guest (or each device) can be assigned its own set of translation tables so that the guest (or device) cannot use the virtual addresses to access a physical location that is off limits to that guest (or device). The fact that the devices are operating on virtual addresses, as well as the translation process, would be transparent to the devices, and thus, from a device's perspective, the device appears to be operating on the physical addresses. Preferably, hardware can be added that performs this translation. It should be noted that such a virtual address scheme can operate independently of the normal virtual address scheme used by the processor.

The SK can reserve a set of pages (e.g., a buffer) solely for DMA transfers, and mark all other pages in the system as disallowing DMA. Any guest can program a device to attempt a DMA burst to one of these pages. After the DMA is complete, the guest, by either direct call or trapped emulation, reports to the SK that it expects the DMA has completed. The SK then copies the DMA region into pages useable by the guest, zero the buffer pages, and allow them to be reallocated. In the use of this technique, it may be the case that there is no hardware enforcement of the allocation of the buffer to a particular guest (thereby enabling a DMA device programmed by a first guest to write on top of the buffer space of a second guest), so each guest can inspect the transferred buffers after they have been copied to the guest's address space. In a preferred embodiment, the DMA buffers will either contain encrypted and HMAC'd data (as from a disk) or have been HMAC'd by the source device. Outbound operation can be performed by a reverse process, but in a system without device-by-device separation, either the guest application, or the guest partition code, can encrypt the data before presenting it to the SK, and the receiving device can check the data.

In general, exclusion can be defined by an arbitrary function $f(a_1, \ldots, a_n)$, where the function returns true/false (or yes/no, etc.) to indicate whether a given access request is permitted or not permitted. The domain of the function preferably includes at least the memory location to which access is request, but may also include any other arbitrary factors (e.g., the identity of the currently-active guest, the identity of the device making the request, a secret or password assigned to devices, some environmental variable such as the current processor ring, etc.). The mechanisms described above are examples of how to implement certain type of exclusion functions.

The Security Kernel

As noted above, in a preferred embodiment the invention makes use of a security kernel 210 (the "SK," shown in FIG. 2) to perform various functions relating to isolation. The following describes various aspects of a preferred security kernel.

In one embodiment of the SK, the SK is a software component that hosts and isolates multiple guests (e.g. operating systems). The SK may assign different hardware devices to different guests, enabling on or more guests to program them directly and without intervention or mediation by the SK. This includes DMA devices. The SK may not include drivers for these devices, and it might never virtualize some or all of these devices. For example, the SK might assign one video card to one guest and a second video card to a second guest. Or it might assign the sound card to one guest and the printer to a second guest. At certain times, the SK may change the assignment of devices to guests. For example, the SK may take away the ability of a guest to program a device directly.

In addition, the SK may assign the same device to another guest and enable it to program the device directly. For example, the SK may take control of the sound card away from one guest operating system and assign it to another guest.

In one embodiment, the SK functionality described above can be implemented as follows: The implementation of isolation between guests may depend on the details of the access requests. Typically, these access requests are the result of CPU instructions or actions by DMA devices. In either case, requests may be based on physical addresses or on virtual addresses. The SK may implement isolation from requests based on virtual addresses by means of algorithms, such as the shadow page table algorithm. The SK may implement isolation from requests based on physical addresses by writing to one of the data structures described above and relying on the access regulator to enforce the policy represented by the value of these data structures.

For example, in order to assign a DMA sound card that operates on physical addresses to guest A that operated only on virtual addresses, the SK has to set up a region of memory that can be accessed by guest A and the sound card (and possibly other devices controlled by guest A), but not by other guests and their devices. Typically, guest A will use virtual addresses to access memory, and the SK may manipulate data structures that control its virtual memory isolation scheme (e.g., f-map for shadow page tables) to give guest A access to some subset S of the physical address space. In addition, the SK has to manipulate the data structures that control the access regulator, such that the sound card can also access S. Now the sound card and guest A have both access to physical addresses S and can exchange data (e.g. sound data to be played on the card) and commands through S. The SK can take control away from guest A by manipulating the data structures that control virtual memory isolation, such that A can no longer access the control registers of the sound card. If the SK wants reuse S or some part of S for some other purpose, it has to modify the data structures that control virtual memory isolation, such that A can no longer access S. Furthermore, the SK has to modify the data structures that control physical memory isolation, such that the sound card can no longer access S.

Example Process for Memory Access Controlled by Exclusion Vector

Figure 9:
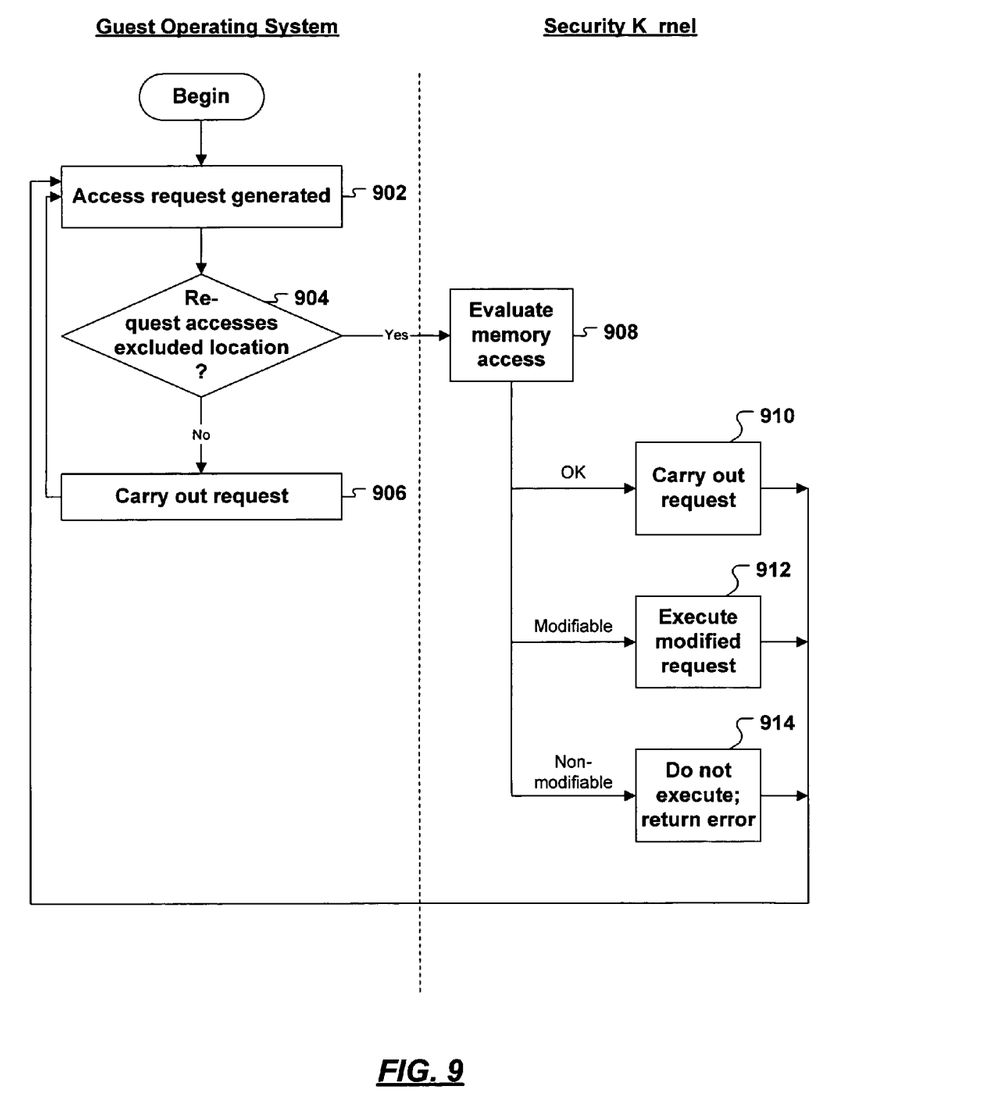
FIG. 9 is a flow diagram of an exemplary process for evaluating requests to access excluded memory.

FIG. 9 shows, in the form of a flow diagram, a process by which memory access requests are evaluated and carried out when access to physical memory locations is restricted by a DMA exclusion vector. At the start of the process, a memory access request is generated (902) in a guest operating system. For example, some event occurring in a guest operating system may cause one of that operating system's device drivers to instruct a DMA device to access a particular memory location. It is then determined whether the request would access a location to which access is excluded (904). For example, this determination may be made by regulator 804 using DMA exclusion vector 806, in the manner described above in connection with FIG. 7. If the request does not access an excluded location, then the request is carried out (906). If the request does access an excluded location (e.g., a location that is listed by the DMA exclusion vector as being excluded), then the request fails—i.e., if the request is a write operation, then the write does not take place, or if the request is a read operation, then some predetermined value (e.g., zero) may be returned.

Alternatively, instead of the operation simply failing, control may be transferred from the guest operating system to the security kernel to evaluate the access request (908). In this case, if the request is determined to be "ok" (i.e., not harmful to the isolation scheme that the security kernel is enforcing), then the request executes (910). If the request is determined to be harmful in its present form but can be modified to make it non-harmful, then the modified request is carried out (912). If the request is determined to be harmful and cannot be modified to make it non-harmful, then the request is not carried out and an error may be returned (914). After the instruction has either been executed (906, 910), modified (912), or rejected (914), the process returns to 902 to process the next access request.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of supporting substantially simultaneous operation of a first operating system and a second operating system on a hardware arrangement, the first operating system comprising software that accesses a physical address space of a memory of the hardware arrangement, the second operating system comprising software that accesses the physical address space of the hardware arrangement wherein said first operating system and said second operating system comprises a driver for a direct memory access device, the method comprising:

providing the first operating system direct access to the physical address space by using the driver when said first operating system executes on the hardware arrangement;

providing the second operating system direct access to the physical address space by using the driver when said second operating system executes on the hardware arrangement;

maintaining a first set of units of the physical address space to which the second operating system cannot access and a second set of units of the physical address space to which the first operating system cannot access;

preventing access the physical address space when a request seeks to access a unit of the physical address space that is a member of either the first set or the second set according to whether said request originates from the first operating system or the second operating system wherein said act of preventing is accomplished without the need for remapping overlapping physical address spaces; and enforcing a policy of isolation between said first operating system and said second operating system by permitting said driver to directly control said device without virtualizing said device to said driver.

2. The method of claim 1, wherein said first set includes at least one unit of the physical address space that is not included in said second set.

3. The method of claim 1, wherein the memory is apportioned into a plurality of pages, wherein the first and second sets identify pages to which access is excluded, and wherein said preventing access act comprises blocking said request based on whether said unit of physical address space is included in a page to which access is excluded.

4. The method of claim 1, further comprising:
using either said first set or said second set to determine whether a request should be blocked, depending upon whether said first operating system or said second operating system, respectively, is currently actively running.

5. The method of claim 1, wherein said blocking act determines whether to block a request as a function of one or more factors comprising at least one of the following:
whether the request originates with the first operating system or the second operating system; or
which one of a plurality of devices the request originates from.

6. The method of claim 1, wherein said blocking act determines whether to block a request as a function of one or more factors comprising: a mode for which access is requested.

7. The method of claim 1, wherein said first and second sets are stored in portions of the memory to which access is excluded under at least one of said first and second sets.

8. A computer-readable storage medium encoded with computer-executable instructions to perform acts comprising:
hosting a first software object wherein said first software object comprises a first operating system that comprises, or is associated with, a driver for a direct memory access device, said driver directly controlling said device without said device being virtualized to said driver;
hosting a second software object;
allowing said first software object and said second software object to directly access a physical address space of a memory;
isolating said first software object and said second software object from each other in accordance with a policy wherein said policy comprises a requirement that there be a portion of the memory to which said first operating system does not have access; wherein said policy is based on an exclusion vector stored in said physical address space, and wherein said exclusion vector indicates with page-level granularity whether access to a portion of the physical address space is excluded, said exclusion vector consisting of one bit for each page of the physical address space wherein the bit indicates whether access to the bit's corresponding page is excluded.

9. The computer-readable storage medium of claim 8, wherein said second software object comprises a second operating system.

10. The computer-readable storage medium of claim 8, wherein said policy comprises a requirement that there be a portion of the memory that is both inaccessible to the first software object and accessible to the second software object.

11. The computer-readable storage medium of claim 8, wherein said policy governs the accessibility of the physical address space to said first software object and said second software object, wherein said computer-executable instructions execute on a computing device that allows or blocks requests to access the physical address space based on contents of an exclusion vector, and wherein said isolating act comprises:
setting the contents of said exclusion vector to block access to portions of said physical address space in accordance with enforcement of said policy.

12. The computer-readable storage medium of claim 11, wherein the contents of said vector are set to allow direct memory access devices to access a buffer portion of said physical address space and is further set to block said direct memory access devices from accessing at least some other portion of said physical address space, and wherein isolating said first software object from said second software object from each other comprises:
allowing a direct memory access device controlled either by any of said first software object and said second software object to write to said buffer portion;
receiving an indication that said first software object has written to said buffer portion; and
copying the contents of said buffer portion to a portion of said physical address space that is accessible to said second software object but not to said first software object.

13. The computer-readable storage medium of claim 12, wherein said second software object performs at least one validity test on the contents that is copied from said buffer portion.

14. The computer-readable storage medium of claim 11, wherein said computing device allows or blocks requests to access the physical address space based on the content of the exclusion vector when said requests are made by a direct memory access device.

15. The computer-readable storage medium of claim 11, wherein a request comprises a read request, and wherein the method further comprises:
after the request has been blocked, returning a predetermined value instead of the contents of the location to which access is requested.

16. The computer-readable storage medium of claim 11, wherein said exclusion vector is stored in said physical address space, and wherein said policy comprises a requirement that said exclusion vector exclude access to portions of said physical address space in which said exclusion vector is stored.

* * * * *